United States Patent [19]

Graham

[11] 4,011,404
[45] Mar. 8, 1977

[54] VIDEO PRODUCTION MODULE

[75] Inventor: William G. Graham, Las Vegas, Nev.

[73] Assignee: Las Vegas Convention Service Company, Las Vegas, Nev.

[22] Filed: Jan. 5, 1976

[21] Appl. No.: 646,854

[52] U.S. Cl. .................. 358/185; 178/DIG. 30; 296/26; 312/7 TV; 358/253
[51] Int. Cl.² ........................................ H04N 5/28
[58] Field of Search ............ 178/7.9, DIG. 30, 6.8; 312/7 TV; 296/26; 360/14

[56] References Cited
UNITED STATES PATENTS

| | | | |
|---|---|---|---|
| 3,575,552 | 4/1971 | Grant | 178/6.8 |
| D162,437 | 3/1951 | O'Conner | 178/7.9 |

*Primary Examiner*—Howard W. Britton
*Attorney, Agent, or Firm*—Frank T. Barber; Carl C. Batz

[57] ABSTRACT

A video production module including a truck. The electronic equipment is contained in rack frames one of which is attached to the frame of the truck, and other rack frames are hingedly mounted on each side of the one rack frame so that they swing about their hinges into a compact arrangement without exposed connecting wires. The module includes a production arm which is pivotally mounted at one end to the truck and which connects with a desk at its other end so that when the arm is raised to vertical position it brings the desk into a protected position above the rack frames.

16 Claims, 4 Drawing Figures

VIDEO PRODUCTION MODULE

This invention relates to apparatus for making video productions and more particularly to a module for housing equipment needed for such purpose and for transporting and arranging the equipment at a location in which such a production is to be made.

BACKGROUND

The making of video productions, such as television broadcasts and recordings, has principally been done in studios and large mobile vans where relatively elaborate equipment is utilized and where the equipment is arranged in a manner which will facilitate the work of the production director and his assistants and also all the technical personnel involved in making the productions. Some of the technicians may be concerned only with a small number of instruments and controls and some others may have more general duties or authority and need to be in positions where an overall view can be had. All of these needs can be met in a studio and large mobile vans where the necessary equipment is permanently assembled and arranged.

However, there has developed a great need for making certain productions at locations outside the studio. For example, there is a demand on the part of manufacturers for making video tapes at industrial plants showing products and procedures and such video tapes may be used for educational or advertising purposes. But the task of transporting the necessary units of equipment and the tedious task of arranging, setting up, connecting and testing the equipment units after they are transported, is laborious, time consuming and very expensive.

Therefore, I have set about to provide a module which would house necessary equipment where the units would remain connected but which would not have any exposed wiring connections as it is transported, which could be moved from place to place without damage to the equipment, which would be compact enough to pass into and out of elevators and through existing entrances and exits to desired locations, and which could be set up and again repacked in a minimum of time. Another objective is to provide the type of arrangements and spacing of the units to which personnel in studios have become accustomed.

DESCRIPTION

One embodiment of my invention is set forth in the accompanying drawings in which FIG. 1 is a perspective view of my improved module fully assembled and ready to be transported;

Figure 1:
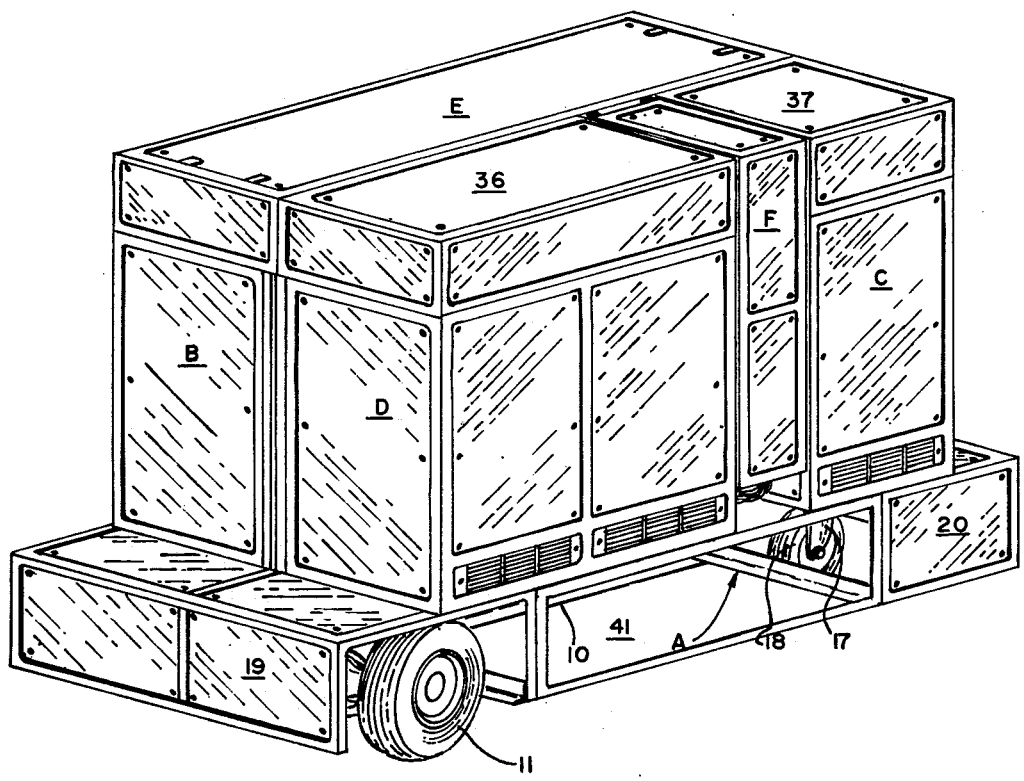
Figure 2:
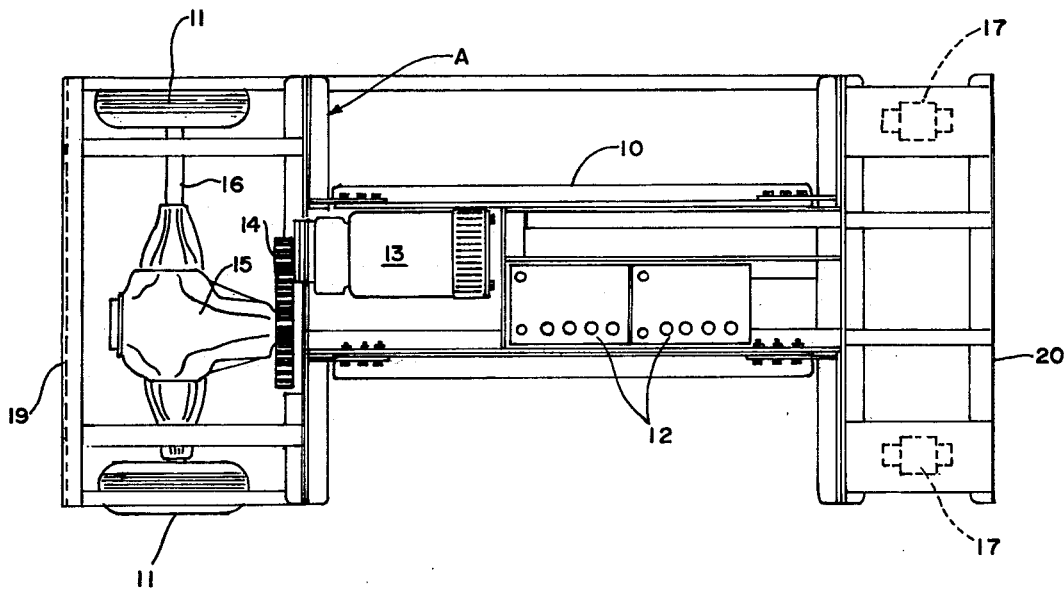
FIG. 2 is a planned view of the truck portion of the improved device.

As illustrated, the improved device involves a truck A. This is best shown in FIGS. 1 and 2. The truck includes a frame 10 suitably made of metal such as square steel tubing. At the rear end of the truck are the drive wheels 11. Electrical batteries 12 are carried in the frame and serve to energize the motor 13 which, through gears 14 and differential 15, drives the axle 16 and the wheels 11.

At its front end the truck is provided with the swivel casters 17 having wheels 18 so that as the truck is driven by wheels 11 its direction may be changed simply by pushing or guiding the truck toward one side or another. Both the rear wheels 11 and the front wheels 18 are equipped with relatively large pneumatic tires so as to absorb shocks and protect the delicate instruments to be carried by the truck. Guard members 19 and 20 are provided to enclose and guard the rear and front wheel structures.

Electronic units and instruments used in making video productions are normally housed in cabinets which in the trade are called "rack frames". These cabinets, or rack frames, are rectangular in shape and usually have panels on each side and on the top and bottom, but have an open front to provide for viewing and access to instruments.

Figure 3:
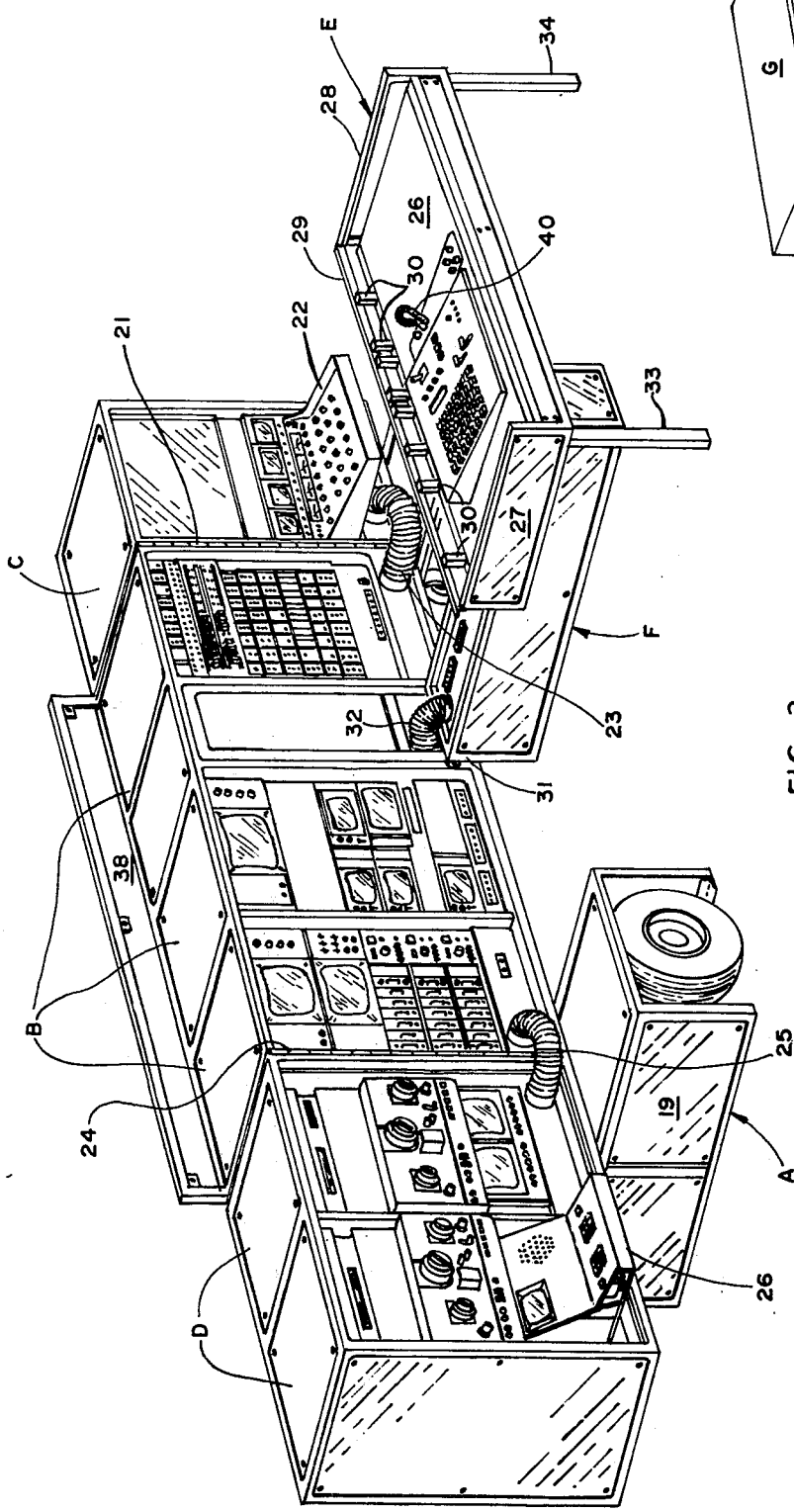
FIG. 3 is a perspective view of the module as in fully set up condition ready for use in location.

As illustrated, my improved module has a first rack frame B, a second rack frame C, and a third rack frame D. FIG. 3 of the drawing shows the rack frames in open position ready for use while FIG. 1 shows these rack frames in folded position ready for transport.

The first rack frame B is positioned on the left-hand side of the truck A and is permanently secured in this position on the truck. This rack frame is of substantial width, occupying substantially the whole length of the truck frame, and extending forwardly at a distance of about one-half of the width of the truck frame.

The forward end of the truck is toward the right as shown in FIGS. 1 through 3 of the drawing, but the instruments are viewed from the right-hand side of the truck. To avoid confusion in describing the rack frames, the open side of the rack frames which gives access to the instruments will, in this description, be called the front of the rack frame and the sides opposite this front will be called the back, irrespective of how the frame may be turned.

The second rack frame C is like the rack frame B except that as shown it is not nearly as wide. It is attached to the rack frame B by the vertical hinge 21. This hinge connects the left-hand front edge of rack frame C with the right-hand front edge of rack frame B. This means that the rack frame C is movable about hinge 21 from the position in which it is shown in FIG. 3 through about 180 degrees until its front is directly adjacent the front of rack frame B. The deck 22, shown in the drawing, is slidable back into the rack frame and the instrument controls are recessed so that the rack frame C may be turned to bring its front parallel with the front of frame C without interference between the controls of the two rack frames.

Electrical connections between the instruments of frames B and C are made at the fronts of these frames and these wires and connections are contained within a flexible conduit 23. It may be noted that with this arrangement no connections are exposed when the frames B and C are turned to closed position and the fronts of each are adjacent each other.

The rack frame D is like frames B and C but is not as wide as frame B, and is positioned on the other side of frame C. The vertical hinge 24 joins the right-hand front edge of frame D with the left-hand front edge of frame B. Wires and connections between frames B and D extend from the front of frame B to the front of frame D and are enclosed in the flexible conduit 25. The deck 26 is slidable back into frame D and the frame D may be swung about hinge 24 from the position in which it is shown in FIG. 3 to a closed position in which the front of frame D is parallel with and adjacent the front of frame B.

Another module unit necessary to a video production system is the director's desk, and controls on the desk are required to be in connection with instruments and equipment contained in the rack frames. Director's desk E as shown in FIG. 3, has a flat top 26 and side pieces 27 and 28. At the back of the desk is a railing 29, and mounted inside the railing are the spaced sockets 30 and the purpose of which will later be explained.

Extending between frame 10 of truck A and the director's desk E is a structure F which is called a production arm. This arm may also contain certain instruments or equipment the controls of which are accessible on the top side of this arm.

The desk E and arm F are also movable with respect to the other module units, and to avoid confusion in the description of these units, the top side of the desk and the production arm as shown in FIG. 3 will still be called the top side even when these units are turned 90 degrees or inverted.

The rear end of arm F is pivotally connected at the top of the arm at each side edge with the frame 10 of the truck. This point of pivotal attachment is designated 31 in FIG. 3 of the drawing. The front end of arm F is pivotally connected, in a similar manner, with the back edge of the bottom of the desk. Connecting wires from inside the rack frame B pass through the flexible conduit 32 and through the inside of the arm F. At the front end of the arm the wires pass out of the arm and into the desk E, connecting with the controls on top of the desk E. Connections are made from the equipment mounted in the arm F with both the desk E and the equipment in the rack frame B, using the arm F as a conduit for the wires.

Figure 4:
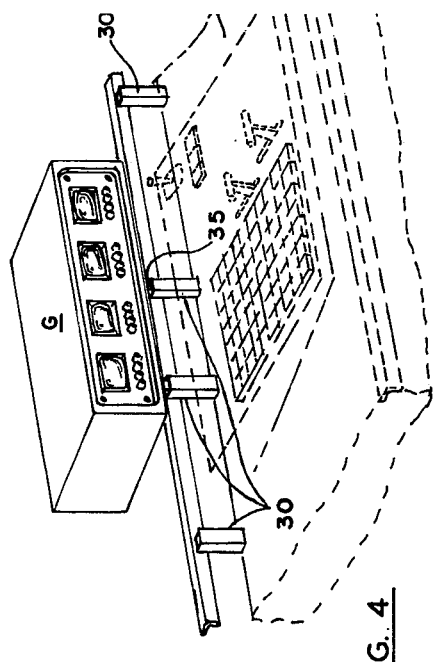
FIG. 4 is a detailed view showing the attachment of the monitor unit to the desk.

Suitably, the legs 33 and 34 are placed under the front portion of the desk E to better support the front part of the desk. When the desk is in its normal position for use as shown in FIG. 3 a monitoring device may be mounted on the desk as shown in FIG. 4. The monitoring device G is encased in a suitable cabinet and has the standards 35 extending downwardly from the cabinet. When mounting the monitoring device the standards 35 may be placed in the sockets 30 at one side of the desk, in the sockets at the other side of the desk, or may be centrally located over the desk whichever position may be desired at the time. When not in use the monitoring device may be stored in the box 36 (FIG. 1), and other tools or equipment may be stored in box 37 (also FIG. 1).

OPERATION

We will assume that the module has been on location, the video production has been made, and the apparatus is to be moved away. Two persons will remove the legs under the desk and turn the desk about its pivoted connection with the arm F through an angle of 90° in which position the plane of the desk is substantially perpendicular with the arm F. Then the desk is lifted, which turns the arm F about its pivoted mounting with the frame of the truck. When the arm has turned through 90 degrees it will be vertical and the desk will be upside down and directly over the rack frame B in the position it is shown in FIG. 1. In this position the instruments are between the desk and the top of rack frame B, and the backboard 38 aids to retain the desk in exactly its proper position.

Then the rack frame D is swung about the hinge 24, through 180°, to bring the front of frame D adjacent and parallel to the front of frame B; and the rack frame C is swung about hinge 21 through 180° to bring the front of frame C adjacent and parallel with the front of frame B.

Desirably the height of arm F is the same as the depth of rack frames C and D, so that as shown in FIG. 1, the right sides of the module when folded up will be flush. Also the length of arm F is such that when the arm is brought to vertical position the desk E, which is attached to it, is brought into contact with the rack frame B, and the width of the desk may be substantially equal to the width of frame B so that the sides of the desk and the frame B will be even. Further, it is desirable as shown in the drawings that the width of the frame D plus the width of the frame C plus the width of arm F equal the total width of frame B. With this arrangement there are no openings in the side of the module. Also, it may be noted that there are no wires or connections exposed which might catch on to something as the module is moved.

By having the storage cubes 36 and 37 the same depth as the desk E the top of the module is also flush and even.

Suitably the motor and the gearing to which the motor is connected are arranged to drive the wheels 11 at a slow speed such as about 3 miles an hour, up ramps, through doorways, and over whatever course is necessary to move the module to its next location. The direction of movement may be changed merely by exerting pressure toward one or another side, the casters 17 responding to such pressure for turning the front wheels 18. Although a great amount of equipment is contained in the module in electrically connected condition, the module is compact with smooth exterior surfaces without any wiring on the outside, and although the equipment may weigh thousands of pounds the module is easy to move.

When the module arrives at the next location at which it is to be used the manner of setting it up for the making of another video production is essentially the reverse of the way it was folded into its compact form. First the storage cubes 36 and 37 are removed from the top of the rack frames, storage cube 41 removed from below rack frames and the rack frames C and D are swung about their hinges into the position they are shown in FIG. 3. Then arm F is swung from its vertical to its horizontal position in which its bottom side rests on the floor. This leaves the desk on the end portion of arm F and resting on its backside with the plane of the desk perpendicular to the arm F. Next the desk is turned about its pivoted attachment to the arm F into its normal position for use as a desk as shown in FIG. 3. Legs 33 and 34 may be attached to help support the desk. If the monitor is desired either at the left-hand or the right-hand side of the desk or in a central position, the standards on its lower side may be placed into selected sockets 30 for such placement as shown in FIG. 4.

In this expanded position the module parts are ready for use in making the video production. In use of this arrangement one technician may be placed in front of the frame C and another in front of frame D where each will be close to the controls for which he is responsible; and the director, who has more general responsibility, may be in front of the desk E where he has access to the talk back microphone 40 and other control devices on this desk. The relative position and spacing of the equipment simulates that to which the personnel are acquainted with in the use of studio equipment. Due to the position of the arm F even the director finds his favorite position where through custom and experience it has been developed that he should be. Yet, the improved module is compact and easily portable from one location to another, and all the time and labor which has heretofore been required for sorting out, assembling, and connecting the many units, has been avoided.

While I have illustrated and described in detail only one embodiment of my invention it will be apparent to those skilled in this art that many embodiments may be constructed and many changes may be made all within the spirit of the invention and the scope of the appended claims.

I claim:

1. A video production module comprising a truck having a frame structure and wheels for transporting the truck from place to place, a rack frame for housing electronic equipment, said rack frame being secured on said truck, a desk in front of and spaced from said rack frame, and a production arm pivotally connected at its one end to said truck frame and connected with said desk at its other end, said arm being movable about its pivotal connection from a horizontal position to a vertical position adjacent said rack frame.

2. A module as set forth in claim 1 in which the bottom of said arm is at the same level as the botton of said wheels on said ground surface whereby when said truck rests on a level floor and said arm is in horizontal position said arm will also rest on said floor.

3. A module as set forth in claim 1 in which said wheels include a pair of drive wheels and a swivel wheel for permitting the changing of a direction in the movement of said truck.

4. A module as set forth in claim 3 including means for driving said wheels.

5. In a video production module for housing and transporting video equipment, a supporting frame, a rack frame on said supporting frame containing at least a part of said equipment, a desk in front of and spaced from said rack frame, and a production arm pivotally connected at its one end to said supporting frame and connected with said desk at its other end, said arm being movable about its pivotal connection from a horizontal position to a vertical position adjacent said rack frame.

6. A module as set forth in claim 5 including electrical wires leading from said desk into said rack frame, said wires being contained within said arm as a conduit.

7. A module as set forth in claim 5 which includes a monitoring device and means for mounting said monitoring device on said desk at different positions between the sides of said desk.

8. A module as set forth in claim 7 in which said means includes spaced tubular holders on said desk and standards on said device which fit into said holders.

9. A module as set forth in claim 5 in which said desk is pivotally attached to said arm and is movable about its pivotal attachment from a position in which its bottom side is adjacent to said arm to a position in which its back edge is adjacent said arm so that when said arm is moved to vertical position said desk overlies said rack frame.

10. A module as set forth in claim 9 in which said desk is pivotally connected at its back side with said arm whereby when said desk is moved to a position in which its back side is adjacent said arm and said arm is moved to a vertical position said desk will be upside down over said rack frame.

11. A module as set forth in claim 10 in which electrical controls are mounted on the side of said desk which is uppermost when said arm is in horizontal position and the bottom of said desk is adjacent said arm, whereby when said arm is in vertical position and said desk is turned to bring its back edge adjacent said arm said controls will be in a position between said desk and said rack frame.

12. A module as set forth in claim 5 including a second rack frame adjacent to said first-mentioned rack frame, a vertical hinge connecting said second rack frame with said first-mentioned rack frame, said second rack frame being movable about said hinge from a position in which a side of said second rack frame is adjacent a side of said first-mentioned rack frame to a position in which the front of said second rack frame is adjacent the front of said first-mentioned rack frame.

13. A module as set forth in claim 12 which includes electrical wires extending from said second rack frame to said first-mentioned rack frame, and a flexible conduit containing said wires.

14. A module as set forth in claim 12 wherein the bottom of said arm when said arm is in horizontal position is even with a side of said second rack frame when said arm is in vertical position and said second rack frame is in said position in which its front is adjacent the front of said first-mentioned rack frame.

15. A module as set forth in claim 12 which includes a third rack frame adjacent to the other side of said first-mentioned rack frame, said third rack frame being hingedly attached to said first-mentioned rack frame and movable about said hinge to a position in which the front of said third frame is adjacent the front of said first-mentioned rack frame.

16. A module as set forth in claim 15 in which when said fronts of said second and third rack frames are adjacent the front of said first-mentioned rack frame the rear sides of said second and third rack frames are flush with the exposed surface of said arm when it is in vertical position.

* * * * *